United States Patent
Igawa et al.

(10) Patent No.: US 9,503,611 B2
(45) Date of Patent: Nov. 22, 2016

(54) IMAGE FORMING APPARATUS, AND METHOD AND DEVICE FOR CREATING DITHER PATTERNS

(71) Applicants: Hiroyuki Igawa, Kanagawa (JP); Hideki Kamaji, Kanagawa (JP)

(72) Inventors: Hiroyuki Igawa, Kanagawa (JP); Hideki Kamaji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/809,953

(22) Filed: Jul. 27, 2015

(65) Prior Publication Data

US 2016/0034794 A1 Feb. 4, 2016

(30) Foreign Application Priority Data

Jul. 29, 2014 (JP) .................................. 2014-154115
Mar. 31, 2015 (JP) .................................. 2015-074053

(51) Int. Cl.
  *H04N 1/46* (2006.01)
  *G06K 15/00* (2006.01)
  *H04N 1/40* (2006.01)
  *H04N 1/405* (2006.01)

(52) U.S. Cl.
  CPC .............. *H04N 1/40* (2013.01); *H04N 1/4058* (2013.01)

(58) Field of Classification Search
  None
  See application file for complete search history.

(56) References Cited

U.S. PATENT DOCUMENTS

| | | | | |
|---|---|---|---|---|
| 4,258,393 A | * | 3/1981 | Ejiri .................... | H04N 1/40068 348/E5.135 |
| 4,517,606 A | * | 5/1985 | Yokomizo .......... | H04N 1/40062 358/3.13 |
| 4,651,293 A | * | 3/1987 | Kato ................... | H04N 1/40075 358/3.14 |
| 4,706,077 A | * | 11/1987 | Roberts ................ | H04N 1/4055 345/599 |
| 4,760,460 A | * | 7/1988 | Shimotohno ........ | H04N 1/4105 358/426.01 |
| 4,924,301 A | * | 5/1990 | Surbrook ................. | H04N 1/52 358/3.17 |

(Continued)

FOREIGN PATENT DOCUMENTS

| | | | |
|---|---|---|---|
| JP | 2007-208639 | | 8/2007 |
| JP | 2012-003180 | | 1/2012 |
| JP | 2012-003180 A | * | 1/2012 |

*Primary Examiner* — Madelein Nguyen
(74) *Attorney, Agent, or Firm* — Harness, Dickey & Pierce, P.L.C.

(57) ABSTRACT

An aspect of the invention provides an image forming apparatus storing first, second, and third dither pattern groups. The first group contains a plurality of line screens, each associated with one of gray levels in a first range, varying such that as the gray level increases, the line width increases. The second group contains a plurality of void-dot screens, each associated with one of gray levels higher than those in the first range, varying such that as the gray level increases, dots increase to reduce void portions surrounded by the dots. The third group contains, for switching from the line screen to the void-dot screen, a plurality of dither patterns varying such that as the gray level increases from a reference gray level, adjacent lines are connected at joint portions tapered toward tip ends in a manner that a position that gradually advances from the tip ends to basal ends.

8 Claims, 7 Drawing Sheets

(56) References Cited

U.S. PATENT DOCUMENTS

| | | | | |
|---|---|---|---|---|
| 5,175,635 A * | 12/1992 | Yamada | H04N 1/40062 | 358/2.1 |
| 5,258,850 A * | 11/1993 | Tai | H04N 1/4058 | 358/3.15 |
| 5,268,774 A * | 12/1993 | Eschbach | H04N 1/4053 | 358/445 |
| 5,504,846 A * | 4/1996 | Fisher | G06T 11/001 | 345/597 |
| 5,754,707 A * | 5/1998 | Knowlton | H04N 1/40075 | 358/3.08 |
| 5,987,221 A * | 11/1999 | Bearss | H04N 1/40062 | 358/1.9 |
| 6,088,512 A * | 7/2000 | Ancin | G09G 3/3611 | 358/1.9 |
| 6,101,002 A * | 8/2000 | Urasawa | H04N 1/4058 | 358/3.13 |
| 6,633,412 B1 * | 10/2003 | Lin | H04N 1/4055 | 358/1.9 |
| 6,646,759 B1 * | 11/2003 | Koga | G06K 15/1822 | 358/1.9 |
| 7,009,729 B2 * | 3/2006 | Fujita | H04N 1/4058 | 358/1.16 |
| 7,251,060 B2 * | 7/2007 | Tonami | H04N 1/4057 | 358/3.16 |
| 7,369,277 B2 * | 5/2008 | Ishihara | G06K 15/00 | 345/596 |
| 7,672,018 B2 * | 3/2010 | Kinoshita | H04N 1/405 | 358/3.06 |
| 8,186,793 B2 * | 5/2012 | Hosaka | B41J 2/14274 | 106/31.13 |
| 8,576,267 B2 * | 11/2013 | Kawanabe | G03G 15/043 | 347/240 |
| 2001/0051065 A1 * | 12/2001 | Togami | H04N 1/4092 | 400/76 |
| 2002/0101616 A1 * | 8/2002 | Shaked | H04N 1/52 | 358/3.13 |
| 2005/0068463 A1 * | 3/2005 | Feng | G09G 3/2055 | 348/574 |
| 2005/0152005 A1 * | 7/2005 | Damera-Venkata | H04N 1/4055 | 358/3.13 |
| 2006/0066910 A1 * | 3/2006 | Yasutomi | H04N 1/52 | 358/3.13 |
| 2006/0279589 A1 * | 12/2006 | Yasutomi | H04N 1/52 | 347/6 |
| 2008/0123146 A1 * | 5/2008 | Ike | H04N 1/4057 | 358/3.13 |
| 2009/0091796 A1 * | 4/2009 | Hirota | H04N 1/52 | 358/3.13 |
| 2009/0195835 A1 * | 8/2009 | Kashibuchi | H04N 1/40087 | 358/3.01 |
| 2010/0103435 A1 * | 4/2010 | Namikata | G06T 3/0006 | 358/1.2 |
| 2012/0163713 A1 * | 6/2012 | Fukuda | H04N 1/4053 | 382/165 |
| 2014/0226187 A1 * | 8/2014 | Sagimori | G06K 15/1876 | 358/3.13 |
| 2015/0092240 A1 * | 4/2015 | Miyake | H04N 1/4051 | 358/2.1 |
| 2015/0092241 A1 * | 4/2015 | Hori | G06K 15/1881 | 358/2.1 |
| 2015/0254537 A1 * | 9/2015 | Abe | H04N 1/40068 | 358/1.2 |
| 2016/0018774 A1 * | 1/2016 | Abe | G03G 15/55 | 399/72 |
| 2016/0155031 A1 * | 6/2016 | Igawa | G06K 15/1877 | 358/3.1 |

* cited by examiner

FIRST
VARIATION

SECOND
VARIATION

THIRD
VARIATION

801

IMAGE FORMING APPARATUS, AND METHOD AND DEVICE FOR CREATING DITHER PATTERNS

CROSS-REFERENCE TO RELATED APPLICATIONS

The present application claims priority to and incorporates by reference the entire contents of Japanese Patent Application No. 2014-154115 filed in Japan on Jul. 29, 2014 and Japanese Patent Application No. 2015-074053 filed in Japan on Mar. 31, 2015.

BACKGROUND OF THE INVENTION

1. Field of the Invention

The present invention relates generally to an image forming apparatus, and a method and a device for creating dither patterns.

2. Description of the Related Art

Electrophotographic image formation is generally inferior to offset printing in image consistency. To alleviate this disadvantage, various techniques have been attempted to improve image consistency of electrophotographic image formation to near the level of offset printing.

One of differences between electrophotography and offset printing is the difference in halftoning. Electrophotography simulates a continuous-tone image by applying image processing such as dithering to image data using a dither pattern such as a line screen or a dot screen.

Meanwhile, dot screens used in electrophotography exhibit high image consistency at low and high gray levels but exhibit low image consistency at medium gray levels. Line screens exhibit high image consistency at the medium gray levels but exhibit low image consistency at the high gray levels. Hence, there are gray levels at which high image consistency is unachievable even if both a dot screen and a line screen are used.

Hybrid screening, which is one of known techniques for alleviating this problem, applies halftoning using a dot screen and a line screen while switching therebetween depending on a gray level range. For example, Japanese Laid-open Patent Application No. 2012-3180 discloses a technique that uses a line screen in a medium gray level range but uses a void-dot screen in a high gray level range to make use of the advantages of dot screens and line screens. Line screens have a disadvantage that as the gray level increases, the width of an area where no toner is deposited (i.e., area between lines) (hereinafter, "no-deposition area") decreases, resulting in unsteady toner deposition in the no-deposition area. To overcome this disadvantage, the technique disclosed in Japanese Laid-open Patent Application No. 2012-3180 switches from the line screen to the void-dot screen, thereby increasing smoothness of tonal gradation from the medium gray levels to the high gray levels.

However, the conventional technique is disadvantageous in that image quality such as color consistency can drop in a gray level range where switching from a line screen to a void-dot screen is made. Furthermore, the conventional technique requires that the two different types of dither patterns be stored, which arises the need of increasing the capacity of memory where the dither patterns are to be stored. Furthermore, the conventional technique requires that dots in a portion where the two different types of dither patterns adjoin be rearranged on a per-dot-matrix basis, which undesirably increases time taken for image processing.

Under the circumstances, there is a need for an image forming apparatus, a dither-pattern creation device, and a dither-pattern creation method that allow enhancing image consistency in the range from medium gray levels to high gray levels and, even if a line screen and a void-dot screen are used, reducing an increase in memory capacity and preventing an increase in image processing time.

SUMMARY OF THE INVENTION

It is an object of the present invention to at least partially solve the problems in the conventional technology.

According to the present invention, there is provided an image forming apparatus comprising: a storage unit configured to store therein a first dither pattern group containing a plurality of dither patterns, each of the dither patterns being associated with one of gray levels in a first range, the dither patterns being line screens, the line screens being line patterns varying with the gray level such that as the gray level increases, line width increases, a second dither pattern group containing a plurality of dither patterns, each of the dither patterns being associated with one of gray levels in a second range higher than the gray levels in the first range, the dither patterns being void-dot screens, the void-dot screens being patterns varying with the gray level such that as the gray level increases, the void-dot diameter or the number of the void-dots increase in a manner to reduce void portions surrounded by the dots, and a third dither pattern group containing a plurality of dither patterns for switching from the line screen to the void-dot screen, the dither patterns being patterns varying with the gray level such that as the gray level increases from a reference gray level, adjacent lines of line patterns are connected at joint portions of the lines, the joint portions being tapered toward tip ends, in a manner that a position where the joint portions are connected gradually advances from the tip ends to basal ends of the joint portions; an image determining unit configured to determine a gray level for each predetermined area of image data input to the image forming apparatus; a halftoning unit configured to select a dither pattern associated with the gray level from the first dither pattern group, the second dither pattern group, and the third dither pattern group stored in the storage unit; and an image forming unit configured to perform image formation by depositing toner using the selected dither pattern.

The present invention also provides a dither-pattern creation device comprising: a first creation unit configured to create a plurality of dither patterns, each of the dither patterns being associated with one of gray levels in a first range, the dither patterns being line screens, the line screens being line patterns varying with the gray level such that as the gray level increases, line width increases; a second creation unit configured to create a plurality of dither patterns, each of the dither patterns being associated with one of gray levels in a second range higher than the gray levels in the first range, the dither patterns being void-dot screens, the void-dot screens being patterns varying with the gray level such that as the gray level increases, the void-dot diameter or the number of the void-dots increase in a manner to reduce void portions surrounded by the dots; and a third creation unit configured to create a plurality of dither patterns for switching from the line screen to the void-dot screen, the dither patterns being patterns varying with the gray level such that as the gray level increases from a reference gray level, adjacent lines of the line patterns are connected at joint portions of the lines, the joint portions being tapered toward tip ends, in a manner that a position where the joint portions are connected gradually advances from the tip ends to basal ends of the joint portions.

The present invention also provides a dither-pattern creation method comprising: creating a plurality of dither patterns, each of the dither patterns being associated with one of gray levels in a first range, the dither patterns being line screens, the line screens being line patterns varying with the gray level such that as the gray level increases, line width increases; creating a plurality of dither patterns, each of the dither patterns being associated with one of gray levels in a second range higher than the gray levels of the first range, the dither patterns being void-dot screens, the void-dot screens being patterns varying with the gray level such that as the gray level increases, the void-dot diameter or the number of the void dots increase in a manner to reduce void portions surrounded by the dots; and creating a plurality of dither patterns for switching from the line screen to the void-dot screen, the dither patterns being patterns varying with the gray level such that as the gray level increases from a reference gray level, adjacent lines in the line patterns are connected at joint portions of the lines, the joint portions being tapered toward tip ends, in a manner that a position where the joint portions are connected gradually advances from the tip ends to basal ends of the joint portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
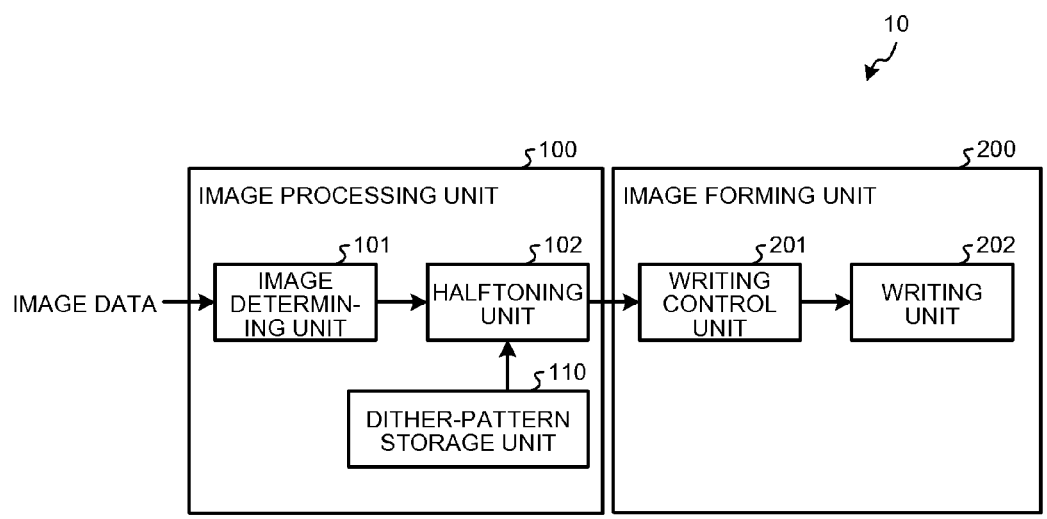
FIG. 1 is a block diagram illustrating a functional configuration of an image forming apparatus according to an embodiment of the present invention.

FIG. 1 is a block diagram illustrating a functional configuration of an image forming apparatus according to an embodiment of the present invention. An image forming apparatus 10 according to the embodiment may be implemented as, for example, a copier, a printer, a facsimile, or a multifunction peripheral having at least one of a copier function, a printer function, and a facsimile function. As illustrated in FIG. 1, the image forming apparatus 10 includes an image processing unit 100 and an image forming unit 200.

The image processing unit 100, which is mounted on a controller circuit board or the like of the image forming apparatus 10, executes image processing on image data input to the image forming apparatus 10 and outputs the processed image data to the image forming unit 200. As illustrated in FIG. 1, the image processing unit 100 includes an image determining unit 101, a halftoning unit 102, and a dither-pattern storage unit 110.

The image determining unit 101 determines a gray level for each predetermined area of the input image data. The halftoning unit 102 reads out a dither pattern associated with the gray level determined by the image determining unit 101 from the dither-pattern storage unit 110 for the each predetermined area and dithers the image data using the read-out dither patterns. Meanwhile, the dither pattern is data representing a pattern for causing image data to simulate a continuous-tone image with dots. More specifically, the halftoning unit 102 reproduces a target gray level by controlling a coloring amount (which may be the amount of deposited toner, for example) per unit area of the dither pattern associated with the gray level. The halftoning unit 102 transmits the dithered image data to the image forming unit 200.

The dither-pattern storage unit 110 is a storage medium such as a hard disk drive (HDD) or a memory. The dither-pattern storage unit 110 stores a first dither pattern group, a second dither pattern group, and a third dither pattern group each containing a plurality of dither patterns.

The dither pattern employed in the embodiment is formed by arranging deposition areas, which are areas to be colored with toner or the like, and no-deposition areas, which are areas not to be colored, are orderly arranged at predetermined intervals. The no-deposition area may hereinafter be referred to as "no-image portion" or "background portion".

A dither pattern formed as a dot pattern where a plurality of dots is arranged is referred to as a dot screen. The dot screen is a dither pattern where deposition areas are arranged in a matrix, with the area other than the deposition areas assigned as a no-deposition area. The dot screen has pattern variations varying such that as the gray level increases, the deposition area expands in accordance with a predetermined rule (which may increase the dot diameter or the number of dots, for example).

A dither pattern formed as a pattern where a plurality of lines lies at a predetermined angle is referred to as a line screen. The line screen is a dither pattern where deposition areas and no-deposition areas extending in a predetermined direction are alternately arranged in stripes. The line screen has pattern variations varying such that as the gray level increases, the deposition areas expand in accordance with a predetermined rule (which may increase the line width or the number of lines) which differs from the rule for the dot screen.

A void-dot screen is a dither pattern where no-deposition areas are arranged in a matrix, with the area other than the no-deposition areas assigned as a deposition area. With the void-dot screen, the no-deposition areas surrounded by dots, which are the deposition area, are rendered as void portions where no toner is deposited. The void-dot screen has pattern variations varying such that as the gray level decreases, the no-deposition areas (the void portions) expand in accordance with a predetermined rule (which may increase the void-dot diameter or the number of the void dots). The screens of the respective dither pattern groups will be described in detail later.

As illustrated in FIG. 1, the image forming unit 200 includes a writing control unit 201 and a writing unit 202. The writing unit 202 is an exposure device which may be, for example, a laser diode (LD) for use in exposure of a photoconductor. The writing control unit 201 generates an exposure command based on the dithered image data output from the image processing unit 100 and transmits the exposure command to the writing unit 202. More specifically, the writing control unit 201 generates a pulse-width modulation signal (PWM signal) for controlling on/off durations of light for use in exposure in accordance with a dither pattern for the image data and transmits the PWM signal to the writing unit 202 as the exposure command. The writing unit 202 exposes the photoconductor to light in accordance with the PWM signal, so that an image is formed by depositing toner on a recording medium.

The dither patterns stored in the dither-pattern storage unit 110 of the image processing unit 100 are described in detail below.

Figure 10:
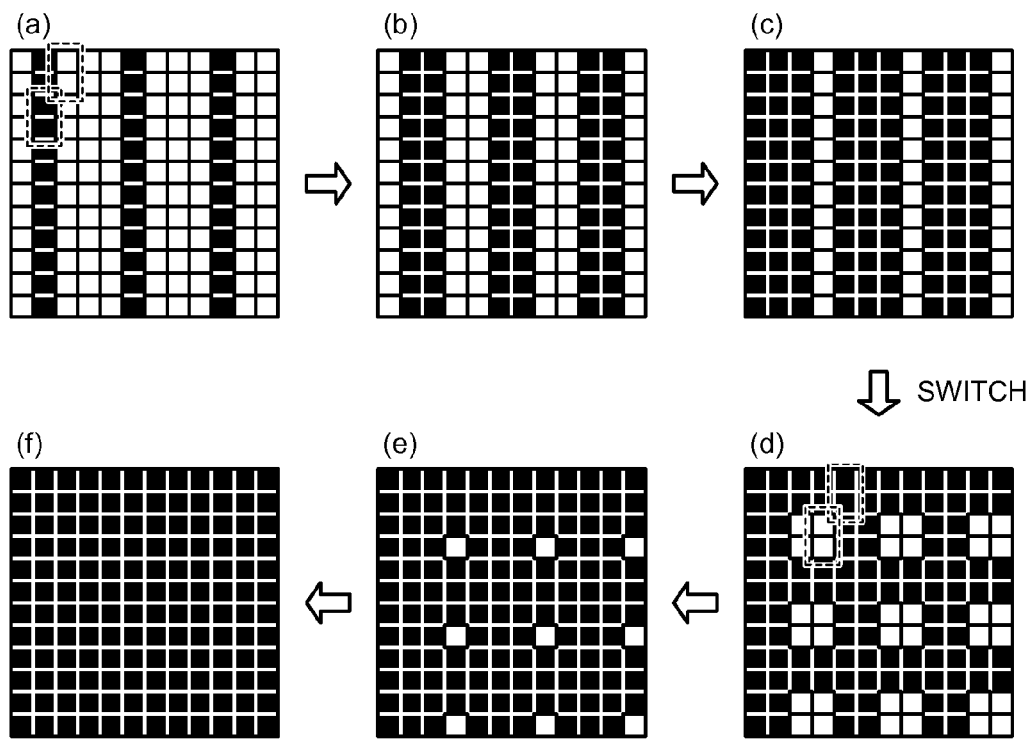
FIG. 10 is a diagram illustrating how a line screen is switched to a void-dot screen according to a conventional technique.
Figure 11:
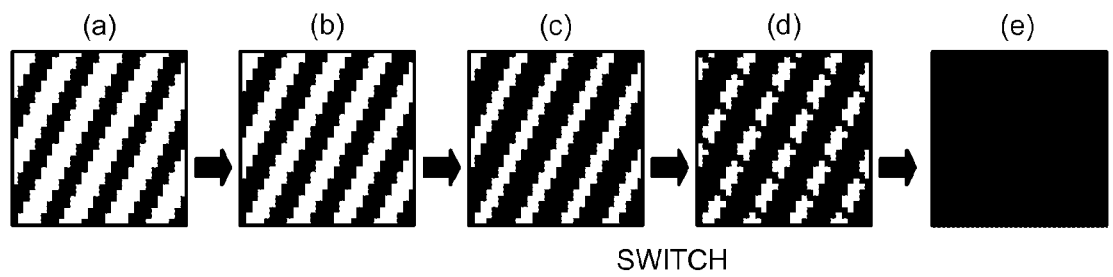
FIG. 11 is a diagram illustrating how a line screen is switched to a void-dot screen according to another conventional technique.

FIG. 10 is a diagram illustrating how a line screen is switched to a void-dot screen according to a conventional technique. FIG. 11 is a diagram illustrating how a line screen is switched to a void-dot screen according to another conventional technique. According to the conventional technique, a line screen is grown in the medium gray level range as illustrated in (a) to (c) of FIG. 10. The line screen is switched to the void-dot screen when the gray level enters the high gray level range as illustrated in (d) of FIG. 10. Thereafter, the void-dot screen is grown as illustrated in (d) to (f) of FIG. 10.

Referring to FIG. 11, according to the other conventional technique, the line screen is grown in the medium gray level range as is the case with a normal line screen as illustrated in (a) to (c) of FIG. 11. As the gray level increases, the line-to-line distance decreases. When the gray level reaches a predetermined gray level at which a deposition area in a no-image portion can vary, switching from the line screen to the void-dot screen is made as illustrated in (d) of FIG. 11. In a high gray level range higher than the predetermined gray level, the void-dot screen is grown so as to fill the no-image portion as is the case with a normal void-dot screen as illustrated in (d) and (e) of FIG. 11. Dots in a portion where the line screen and the dot screen adjoin are rearranged.

The reason why dither pattern switching is performed at a predetermined gray level in the conventional techniques is described below. Prior to describing the reason, line screens and dot screens which are typical image processing patterns (dither patterns) used in electrophotography are described below.

A line screen is grown as the gray level increases in an order where priorities are given to pixels such that the closer to a virtual line referred to as a center line a pixel is, the higher the priority given to the pixel, and vice versa. Therefore, as the gray level increases, the line becomes thicker and, accordingly, the line-to-line distance decreases. Hence, line screens have an advantage that a toner-deposited area is steady at the low and medium gray levels where the line-to-line distance is sufficiently large. However, at the high gray levels where the line-to-line distance is not sufficiently large, the toner-deposited area can vary in a manner that toner is deposited on a no-deposition area (no-image portion) in some cases but not in other cases. Put another way, line screens have a disadvantage that, as the gray level increases, the width of the no-deposition area (between lines) decreases, resulting in unsteady toner deposition in the no-deposition area.

A dot screen is grown as the gray level increases in an order where priorities are given to pixels such that the smaller the distance between a target pixel and a pixel referred to as a growth center, the higher priority given to the target pixel, and vice versa. Accordingly, dot screens are advantageous in that toner-deposited areas are steady at the low gray levels where the dot-to-dot distance is sufficiently large but disadvantageous in that no-toner-deposited areas between dots are likely to vary at the medium gray levels where the dot-to-dot distance is neither sufficiently large nor sufficiently small. At the high gray levels, a screen formed with void dots that are to be increased in minor diameter is desirably employed. This is because such a void-dot screen can make toner-deposited areas more steady than those of a line screen at the high gray levels.

With the above-described characteristics of the screens taken into account, it is preferable to apply halftoning by using line screens in the medium gray level range and using void-dot screens in the high gray level range, thereby making toner-deposited areas steady.

Figure 8:
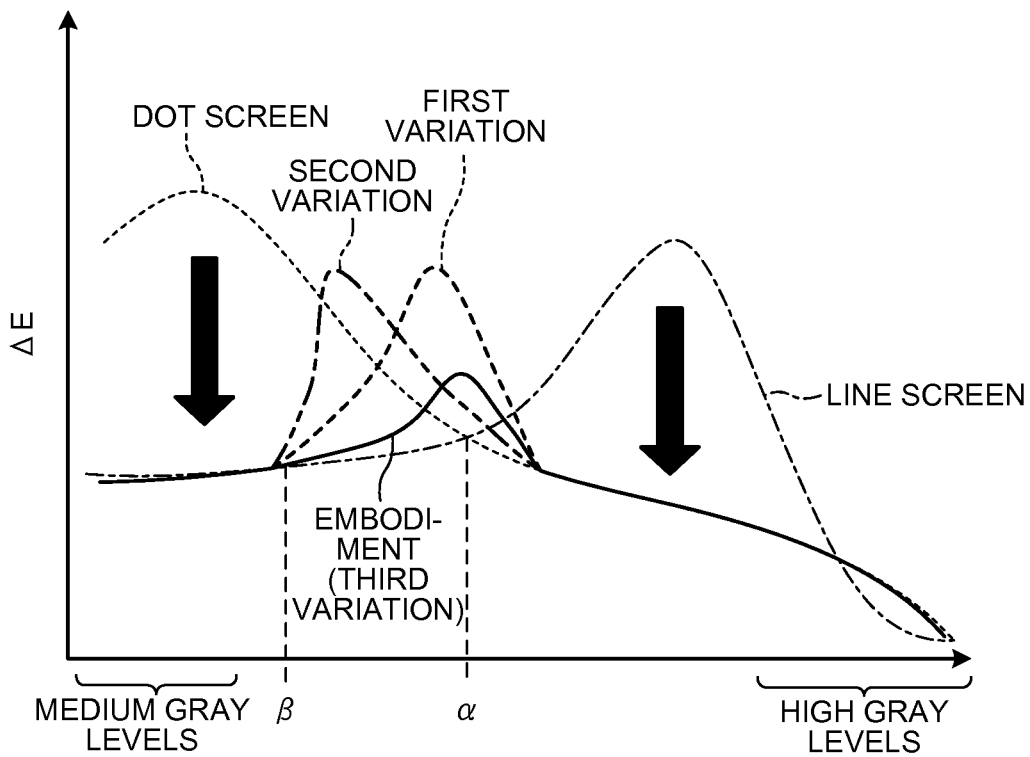
FIG. 8 is a graph describing an advantage provided by the dither patterns according to the embodiment.

The conventional techniques make switching from a line screen to a void-dot screen to overcome disadvantages of dot screens and line screens, thereby enhancing image consistency at a boundary between the medium gray levels and the high gray levels as compared with halftoning using only either a void-dot screen or a line screen (i.e., a single dither pattern) (see FIG. 8).

However, the conventional technique has a disadvantage that, because consideration is not given to image consistency in the gray level range where the dither pattern is switched, image in this gray level range can be inconsistent. Furthermore, from the need of storing the two types of dither patterns (the line screens and the void-dot screens) in a storage unit, the need of increasing the capacity of memory where the dither patterns are to be stored arises. Furthermore, the need of rearranging dots in a portion where the two different types of dither patterns adjoin on a per-dot-matrix basis arises, which undesirably increases time taken for image processing.

Figure 12:
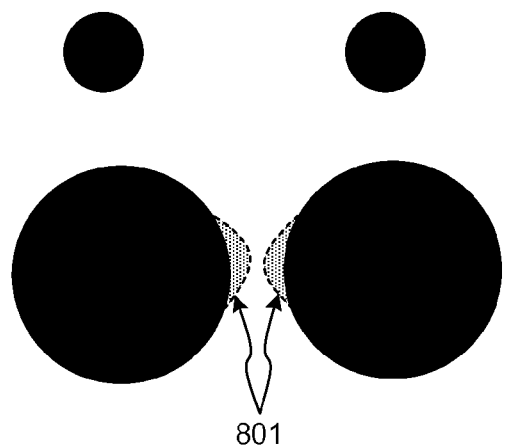
FIG. 12 is a diagram illustrating an example of toner deposition on a no-toner portion which depends on a dot-to-dot distance.
Figure 13:
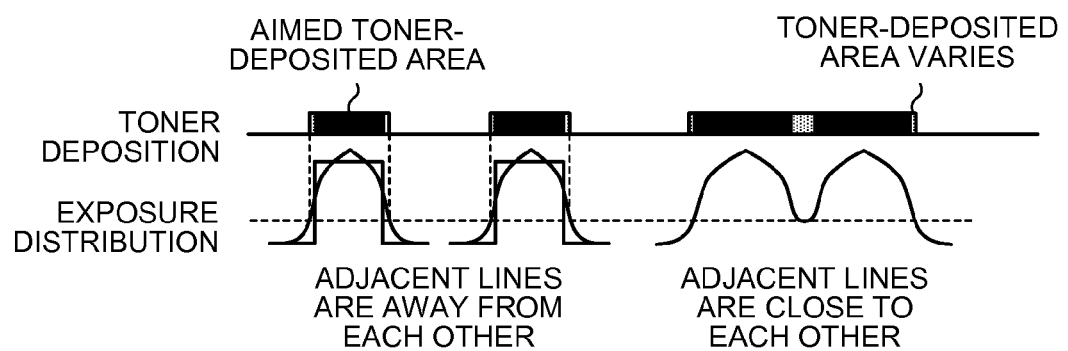
FIG. 13 is a diagram for describing relationship between dot-to-dot distance and toner deposition.

FIG. 12 is a diagram illustrating an example of toner deposition on a no-toner portion which depends on the dot-to-dot distance. FIG. 13 is a diagram for describing relationship between dot-to-dot distance and toner deposition.

As illustrated in FIG. 12, in electrophotography, toner can unexpectedly be deposited on a no-image portion (background portion) (indicated by reference numeral 801 in FIG.

12) when the dot-to-dot distance or the line-to-line distance is small. This is attributed to a certain level of exposure intensity developed in the no-image portion (background portion) by overlap of exposure distribution edges of adjacent dots or adjacent lines. This toner deposition causes the toner-deposited area to vary, adversely affecting image quality such as color consistency and graininess.

In the embodiment, as in the conventional technique, halftoning is applied by using line screens in the medium gray level range and void-dot screens in the high gray level range. However, in contrast to the conventional technique, in the embodiment, switching from a line screen to a void-dot screen is made by using dither patterns which less likely exert the above-described adverse effect on a no-image portion (no-deposition area; background portion) to make the toner-deposited area steady. The embodiment thus makes the toner-deposited area at the boundary between the medium gray levels and the high gray levels steady, thereby allowing producing an image of high image quality at all the gray levels. The embodiment is described in detail below.

Referring back to FIG. 1, the dither-pattern storage unit 110 of the embodiment stores the plurality of dither patterns described below in each of the first dither pattern group, the second dither pattern group, and the third dither pattern group given below. The each dither pattern of the dither pattern groups is stored in the dither-pattern storage unit 110 as being associated with a gray level.

The first dither pattern group contains a plurality of dither patterns, each of which is associated with one of the medium gray levels (belonging to a first range). The dither patterns are line screens which are line patterns varying with the gray level such that as the gray level increases, the line width increases.

The second dither pattern group contains a plurality of dither patterns, each of which is associated with one of the high gray levels (belonging to a second range). The dither patterns are void-dot screens which are patterns varying with the gray level such that as the gray level increases, the void-dot diameter or the number of the void dots increases in a manner to reduce void portions which are the no-deposition areas.

The third dither pattern group contains a plurality of dither patterns for switching from a line screen of the first dither pattern group to a void-dot screen of the second dither pattern group. More specifically, the third dither pattern group contains the dither patterns, each for one gray level. The dither patterns are patterns varying with the gray level such that as the gray level increases from a reference gray level $\beta$, adjacent lines are connected at joint portions that are tapered toward tip ends of the joint portions in a manner that a position where the joint portions are connected gradually advances from the tip ends to basal ends of the joint portions.

The reference gray level $\beta$ is a gray level at which switching from the line screen to the void-dot screen starts and corresponds to a minimum line-to-line distance at which a deposition area in a no-image portion between the adjacent lines is steady.

The dither patterns contained in the third dither pattern group are patterns in which the adjacent lines are connected to intersect with the direction in which the lines extend and, in a state where the adjacent lines are connected at the tip ends, the diameter of the void portion of the void-dot pattern is equal to the line-to-line distance.

Figure 2:
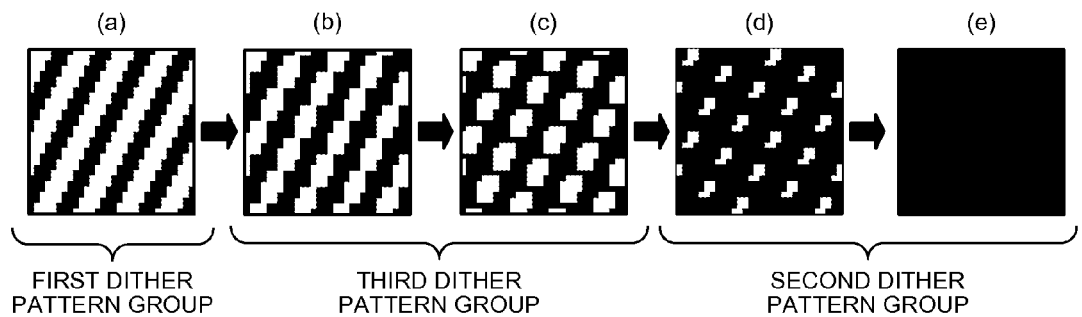
FIG. 2 is a diagram illustrating how a line screen is switched to a void-dot screen in the embodiment.

FIG. 2 is a diagram illustrating how a line screen is switched to a void-dot screen in the embodiment.

In the embodiment, the first dither pattern group for the medium gray level range (first range) up to the predetermined reference gray level $\beta$ is created and stored in advance. As illustrated in (a) of FIG. 2, the first dither pattern group contains a plurality of dither patterns, each for one gray level, in which lines are grown (i.e., the line width is increased) as the gray level increases as is the case with a normal line screen.

For gray levels higher the reference gray level $\beta$, dither patterns for a switching stage from a line screen to a void-dot screen are created as the third dither pattern group. More specifically, as illustrated in (b) of FIG. 2, a plurality of dither patterns, each for one gray level, in which projections (protrusions) that are tapered from thick basal ends toward tip ends are disposed on lines at intervals that depend on screen ruling are created.

The third dither pattern group further contains, for still higher gray levels, a plurality of dither patterns, each for one gray level, in which the protrusions are grown so as to reduce an area where toner deposition varies. More specifically, the protrusions are grown so as to connect adjacent lines in a manner to intersect with the direction in which the lines extend as illustrated in (c) of FIG. 2 or, put another way, so as to connect protrusions on lines facing each other. The dither patterns are preferably configured such that the diameter of the void dot is equal to the line-to-line distance in a state where the lines are connected to intersect with the lines.

Figure 3:
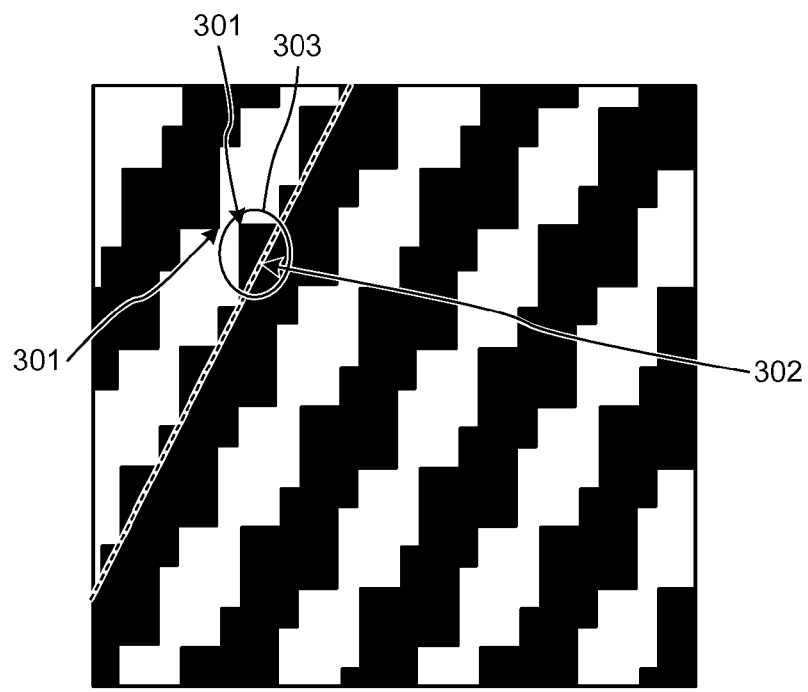
FIG. 3 is an enlarged view of the dither pattern illustrated in (b) of FIG. 2, which is an example of a dither pattern of a third dither pattern group according to the embodiment.

FIG. 3 is an enlarged view of the dither pattern illustrated in (b) of FIG. 2, which is an example of the dither pattern of the third dither pattern group according to the embodiment. As illustrated in FIG. 3, the dither pattern of the third dither pattern group includes projections (protrusions) 303, tapered tip ends 301 of the protrusions 303, and basal ends 302 of the protrusions 303. The dither pattern is formed such that as the gray level increases, the lines are grown so that facing lines are connected at the tapered tip ends 301 of the protrusions 303.

Figure 4A:
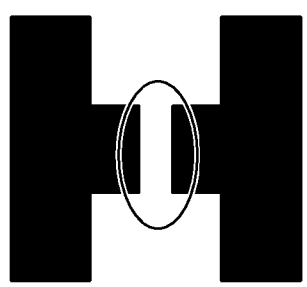
FIGS. 4A, 4B, and 4C are diagrams for describing variations of line connection.
Figure 4B:
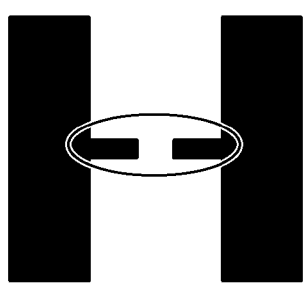
Figure 4C:
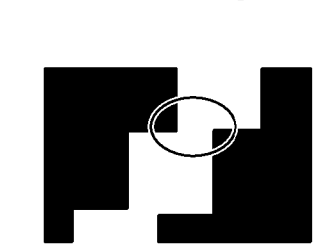

There are variations in how the lines are grown to be connected to each other. FIG. 4 is a diagram for describing the variations of line connection. The right and left solid portions in each of (a) to (c) of FIG. 4 indicate adjacent lines; the circled portions indicate protrusions where the lines are to be connected. A first variation illustrated in (a) of FIG. 4 connects the lines by growing the protrusions so as to have the same width as the line width. A second variation illustrated in (b) of FIG. 4 connects the lines by growing the protrusions so as to have a width smaller than the line width. A third variation illustrated in (c) of FIG. 4 forms the protrusions in a triangular shape having a thick basal end and a tapered tip end and connects the lines at the tip ends of the protrusions. In the embodiment, the third variation is employed.

If the protrusions are grown with a method using the first variation illustrated in (a) of FIG. 4, the area where toner deposition varies in the no-image portion between the protrusions expands when the protrusions are connected to form void portions. If the protrusions are grown with a method using the second variation illustrated in (b) of FIG. 4, the toner-deposited area in the no-image portion between the protrusions varies less. However, because a line deposition portion also varies when the protrusions are connected, the method using the second variation undesirably expands the area where toner deposition varies.

By contrast, growing the protrusions with a method using the third variation illustrated in (c) of FIG. 4 can advantageously reduce the area where toner deposition varies. With the method using the third variation, the deposition area in the non-image portion between the protrusions varies less than that with the method using the first variation. With the method using the third variation, a deposition area on the protrusions varies less than that with the method using the second variation. Hence, the method using the third variation is superior in terms of image consistency as a method for growing the protrusions. For this reason, in the embodiment, the protrusions are connected by growing the lines with the method using the third variation.

Referring back to FIG. 2, for still higher gray levels which belong to the high gray level range (second range), a plurality of dither patterns in which dots are grown so as to fill the no-image portion as is the case with a normal void-dot screen as illustrated in (d) and (e) of FIG. 2 are stored as the second dither pattern group.

Figure 5:
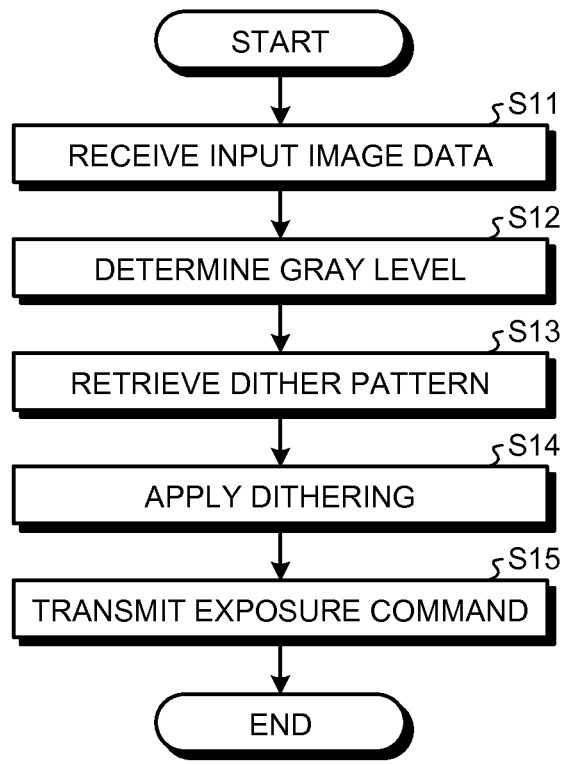
FIG. 5 is a flowchart illustrating an example of a procedure for an image forming process according to the embodiment.

An image forming process to be performed by the image forming apparatus 10 according to the embodiment configured as described above is described below. FIG. 5 is a flowchart illustrating an example of a procedure for the image forming process according to the embodiment.

The image processing unit 100 receives input image data to be printed (step S11). The image determining unit 101 determines a gray level for each predetermined area of the input image data (step S12). The halftoning unit 102 retrieves a dither pattern associated with the gray level determined by the image determining unit 101 from the dither-pattern storage unit 110 (step S13). The halftoning unit 102 dithers the image data using the retrieved dither pattern (step S14). The halftoning unit 102 transmits the dithered image data to the image forming unit 200.

In the image forming unit 200, the writing control unit 201 receives the dithered image data, generates a PWM signal which is to serve an exposure command based on the image data (i.e., the dither pattern), and transmits the PWM signal to the writing unit 202 (step S15). Eventually, a recording medium where a continuous tone image is formed is output.

A dither-pattern creation device 500 (FIG. 6) according to the embodiment that creates the dither patterns to be stored in the dither-pattern storage unit 110 is described below. The dither-pattern creation device 500 has a hardware structure utilizing a typical computer including a CPU (central processing unit), a storage device such as a ROM (read only memory) and a RAM (random access memory), an external storage device such as an HDD and/or a DVD (digital versatile disk) drive, a display device, and an input device such as a keyboard and a mouse. However, the structure of the dither-pattern creation device 500 is not limited thereto. Alternatively, the dither-pattern creation device 500 may be included in the image forming apparatus 10 (e.g., in the image processing unit 100).

Figure 6:
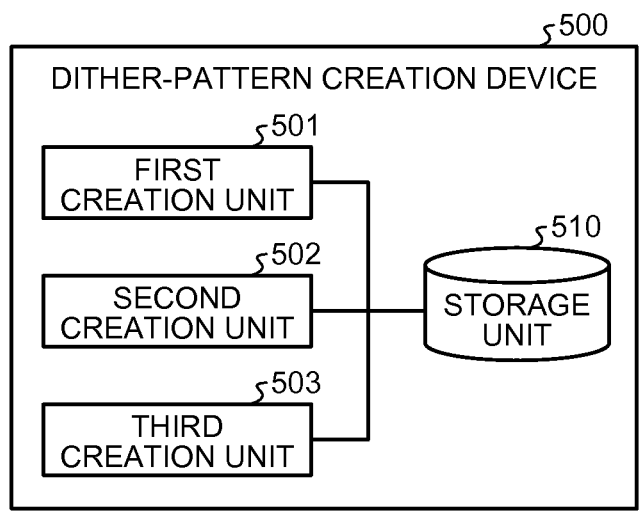
FIG. 6 is a block diagram illustrating a functional configuration of a dither-pattern creation device according to the embodiment.

FIG. 6 is a block diagram illustrating a functional configuration of the dither-pattern creation device 500 according to the embodiment. As illustrated in FIG. 6, the dither-pattern creation device 500 of the embodiment includes a first creation unit 501, a second creation unit 502, a third creation unit 503, and a storage unit 510.

The storage unit 510 which is a storage medium such as an HDD or a memory stores dither patterns created by each of the first creation unit 501, the second creation unit 502, and the third creation unit 503.

Figure 7:
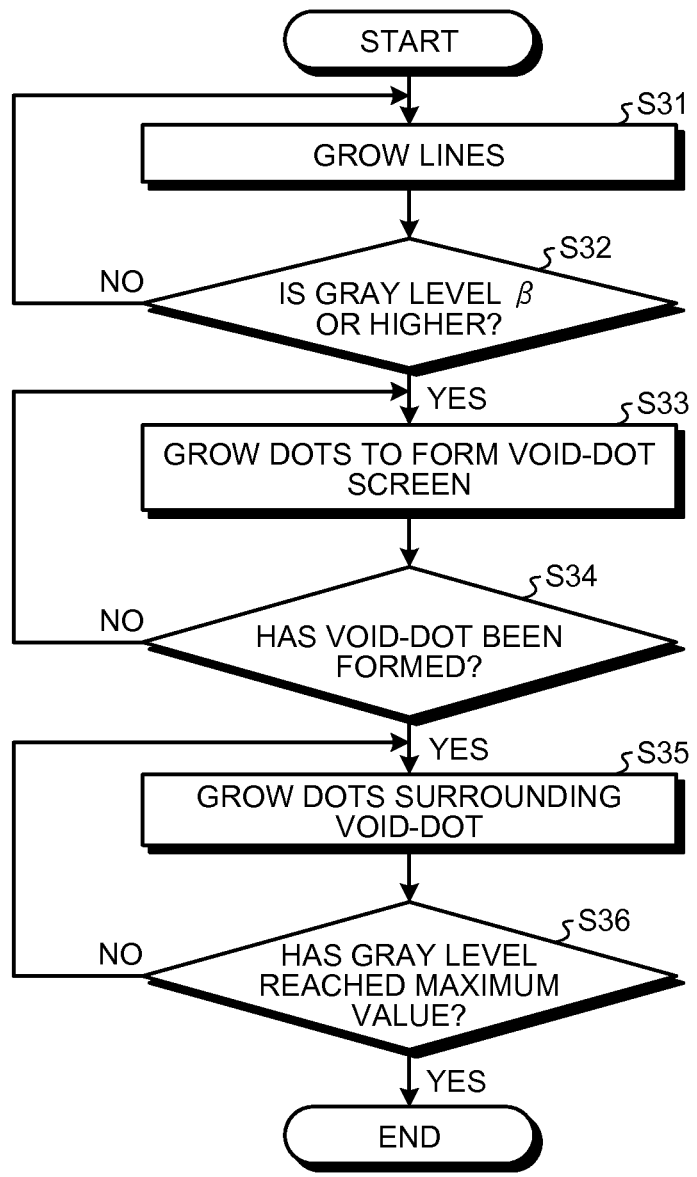
FIG. 7 is a flowchart illustrating an example of a procedure for a dither-pattern creating process according to the embodiment.

How the first creation unit 501, the second creation unit 502, and the third creation unit 503 create the dither patterns is described below. FIG. 7 is a flowchart illustrating an example of a procedure for a dither-pattern creating process according to the embodiment.

The first creation unit 501 creates the dither patterns of the first dither pattern group by growing lines of a line screen as the gray level increases in the medium gray level range as illustrated in (a) of FIG. 2 (step S31). More specifically, the first creation unit 501 creates line screens, each for one gray level, that are increasing in line width, associates the respective created line screens with the gray levels, and stores the line screens in the storage unit 510 as the first dither pattern group.

The first creation unit 501 determines whether or not the gray level that corresponds to the created dither patterns is equal to or higher than the gray level $\beta$ (step S32). If the gray level is lower than the gray level $\beta$ (No at step S32), processing returns to the step S31 where the first creation unit 501 continues creating the dither patterns of the first dither pattern group.

If the gray level is equal to or higher than the gray level $\beta$ (Yes at step S32), the third creation unit 503 starts creating the dither patterns of the third dither pattern group. More specifically, the third creation unit 503 creates dither patterns which are patterns, each for one gray level, in which dots are grown so that tapered projections (protrusions) are disposed on lines at intervals that depend on screen ruling to form a void-dot screen as illustrated in (b) and (c) of FIG. 2 (step S33). As a result, dither patterns in which, as the gray level increases, protrusions on adjacent lines are connected at tip ends of the protrusions are created. The third creation unit 503 associates each of the plurality of created dither patterns with one gray level and stores the dither patterns in the storage unit 510 as the third dither pattern group.

The third creation unit 503 determines whether or not void dots have been formed as a result that the gray level has increased to a value at which a dither pattern where the protrusions on adjacent lines are connected at the tip ends is created (step S34).

If the void dots have not been formed yet (No at step S34), the third creation unit 503 repeats processing at step S33.

On the other hand, if the void dots have been formed (Yes at step S34), the second creation unit 502 creates the dither patterns of the second dither pattern group by creating dither patterns, each for one gray level, in which dots surrounding each void dot are grown so as to maximize the minor diameter and minimize the peripheral length of the void dot as illustrated in (d) of FIG. 2 (step S35). The second creation unit 502 stores the created dither patterns in the storage unit 510 as the second dither pattern group.

The second creation unit 502 determines whether or not the gray level that corresponds to the created dither patterns has reached its maximum value (step S36). If the gray level has not reached its maximum value yet (No at step S36), the second creation unit 502 repeats processing at step S35. The dots are grown until such a solid image as that illustrated in (e) of FIG. 2 is created.

On the other hand, if the gray level that corresponds to the created dither patterns has reached its maximum value (Yes at step S36), the procedure ends.

Each of the plurality of dither patterns of each of the first, second, and third dither pattern groups is stored in the storage unit 510 as being associated with a gray level as described above.

By creating and storing the dither pattern groups using the above-described screen growing method, image consistency in the range from the medium gray levels to the high gray levels can be enhanced without, unlike the conventional technique, requiring an increase in memory capacity. This advantage is more specifically described below.

FIG. 8 is a graph describing the advantage provided by the dither patterns according to the embodiment. Referring to FIG. 8, where gray levels are plotted on the horizontal axis and average color differences ΔE in a reference page are plotted on the vertical axis, the higher the value of the color difference ΔE, the lower the image consistency. In FIG. 8, the dashed line (dot screen) and the long dashed and short dashed line (line screen) indicate results obtained using the conventional technique; the solid line indicates a result of the embodiment (obtained using the third variation illustrated in (c) of FIG. 4). In FIG. 8, the thick dashed line indicates a result obtained using a line screen in which lines are connected with the first variation illustrated in (a) of FIG. 4; the thick long dashed double-short dashed line indicates a result obtained using a line screen in which lines are connected with the second variation illustrated (b) of in FIG. 4. The solid line indicating the result of the embodiment is obtained using a line screen in which lines are connected with the third variation illustrated (c) of in FIG. 4.

As illustrated in FIG. 8, dot screens are poor in image consistency at the medium gray levels; line screens are poor in image consistency at the boundary between the medium gray levels and the high gray levels. When comparison is made only in the range between a gray level α and the gray level β, the dither patterns according to the embodiment are poorer in image consistency than those of the conventional technique (the dot screen, the line screen); however, the difference is slight. The dither patterns according to the embodiment are considerably enhanced in image consistency at the gray levels at which the screens (the dither patterns) exhibit poor image consistency. It is indicated that the dither patterns according to the embodiment improve image consistency as a whole (in the range of the medium gray levels and higher).

Figure 9:
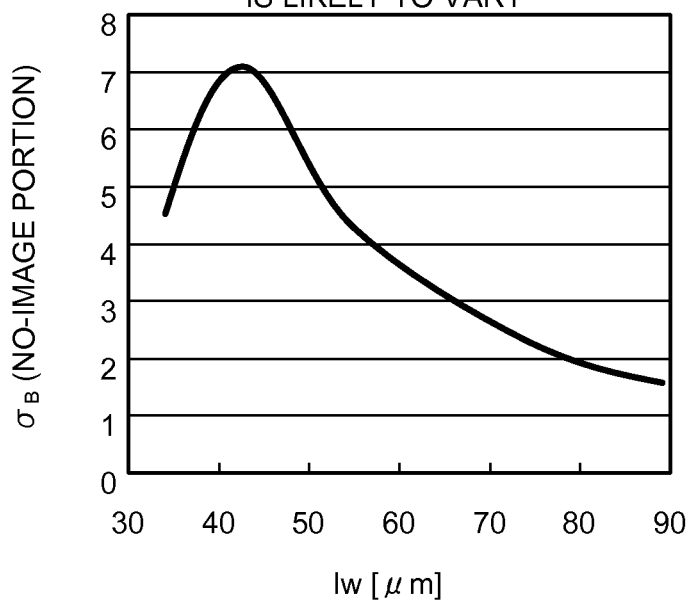
FIG. 9 is a graph describing the advantage provided by the dither patterns according to the embodiment.

In FIG. 8, the gray level α is the gray level at which the color difference ΔE of the line screen and that of the void-dot screen are equal to each other and then are reversed in each of values. The gray level β is the gray level at which switching from a line screen to a void-dot screen starts and is the reference gray level described earlier. FIG. 9 is a graph illustrating how brightness consistency in a no-image portion (background portion; no-deposition area) varies with the line-to-line distance.

In the embodiment, it is assumed that brightness is inconsistent when the value of σB (standard deviation of brightness in the no-image portion) is equal to or higher than three. The reference gray level β is set to a gray level corresponding to a line-to-line distance (Iw) of approximately 70 μm, at which variation in brightness in the no-image portion between adjacent lines starts increasing.

The conventional technique uses two types of dither patterns (a first dither pattern and a second dither pattern) while making switching therebetween at a predetermined area ratio. Accordingly, a situation where the first dither pattern is applied to one of adjacent portions in an image and the second dither pattern is applied to the other portion can occur. In this case, dots at and near a boundary between the adjacent portions are rearranged to make the boundary inconspicuous. In short, the conventional technique requires determining area ratios of adjacent halftone portions and rearranging dots depending on a result of the determination.

In contrast, the embodiment uses only a single type of dither pattern. Accordingly, the need of determining area ratios of adjacent halftone portions and rearranging dots depending on a result of the determination is eliminated. Hence, according to the embodiment, an increase in time taken for image processing can be reduced as compared with the conventional technique.

As described above, according to the embodiment, the dither-pattern creation device 500 creates the first dither pattern group containing a plurality of dither patterns, each of which is associated with one of the medium gray levels and which are line screens which are patterns varying with the gray level such that as the gray level increases, the line width increases, the second dither pattern group containing a plurality of dither patterns, each of which is associated with one of the high gray levels and which are void-dot screens varying with the gray level such that as the gray level increases, dots increase, and the third dither pattern group containing, for switching from the line screen to the void-dot screen, a plurality of dither patterns which are patterns varying with the gray level such that as the gray level increases from the reference gray level β, adjacent lines are connected at joint portions which are tapered toward tip ends in a manner that a position where the joint portions are connected gradually advances from the tip ends to basal ends of the joint portions, and stores the dither pattern groups in the dither-pattern storage unit 110. The image forming apparatus 10 determines a gray level for each predetermined area of image data input to the image forming apparatus 10, selects a dither pattern associated with the gray level from the first dither pattern group, the second dither pattern group, and the third dither pattern group stored in the dither-pattern storage unit 110, and applies image processing to the image data using the selected dither patterns. Hence, according to the embodiment, image consistency in the range from the medium gray levels to the high gray levels can be enhanced. Furthermore, even if a line screen and a void-dot screen are used, an increase in memory capacity can be reduced and an increase in image processing time can be prevented.

According to an aspect of the present invention, image consistency in the range from medium gray levels to high gray levels can be enhanced and, furthermore, even if a line screen and a void-dot screen are used, an increase in memory capacity can be reduced and an increase in image processing time can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a storage unit configured to store therein
   a first dither pattern group containing a plurality of dither patterns, each of the dither patterns being associated with one of gray levels in a first range, the dither patterns being line screens, the line screens being line patterns varying with the gray level such that as the gray level increases, line width increases,
   a second dither pattern group containing a plurality of dither patterns, each of the dither patterns being associated with one of gray levels in a second range higher than the gray levels in the first range, the dither patterns being void-dot screens, the void-dot screens being patterns varying with the gray level such that as the gray level increases, the void-dot diameter or the number of the void-dots increase in a manner to reduce void portions surrounded by the dots, and
   a third dither pattern group containing a plurality of dither patterns for switching from the line screen to the void-dot screen, the dither patterns being patterns varying with the gray level such that as the gray level increases from a reference gray level, adjacent lines of line patterns are connected at joint portions of the lines, the joint portions being tapered toward tip ends, in a manner that a position where the joint portions are connected gradually advances from the tip ends to basal ends of the joint portions;

an image determining unit configured to determine a gray level for each predetermined area of image data input to the image forming apparatus;

a halftoning unit configured to select a dither pattern associated with the gray level from the first dither pattern group, the second dither pattern group, and the third dither pattern group stored in the storage unit; and an image forming unit configured to perform image formation by depositing toner using the selected dither pattern.

2. The image forming apparatus according to claim 1, wherein the reference gray level is a gray level corresponding to a minimum line-to-line distance at which a deposition area of the toner in a no-image portion between lines is steady.

3. The image forming apparatus according to claim 1, wherein the third dither pattern group contains the plurality of dither patterns, the dither patterns being patterns in which the adjacent lines are connected in a manner to intersect with a direction in which the lines extend.

4. The image forming apparatus according to claim 3, wherein the third dither pattern group contains dither patterns in which, in a state where the adjacent lines are connected at the tip ends, diameter of the void portion of the void-dot pattern is equal to line-to-line distance of the adjacent lines.

5. A dither-pattern creation device comprising:
a first creation unit configured to create a plurality of dither patterns, each of the dither patterns being associated with one of gray levels in a first range, the dither patterns being line screens, the line screens being line patterns varying with the gray level such that as the gray level increases, line width increases;

a second creation unit configured to create a plurality of dither patterns, each of the dither patterns being associated with one of gray levels in a second range higher than the gray levels in the first range, the dither patterns being void-dot screens, the void-dot screens being patterns varying with the gray level such that as the gray level increases, the void-dot diameter or the number of the void-dots increase in a manner to reduce void portions surrounded by the dots; and a third creation unit configured to create a plurality of dither patterns for switching from the line screen to the void-dot screen, the dither patterns being patterns varying with the gray level such that as the gray level increases from a reference gray level, adjacent lines of the line patterns are connected at joint portions of the lines, the joint portions being tapered toward tip ends, in a manner that a position where the joint portions are connected gradually advances from the tip ends to basal ends of the joint portions.

6. The dither-pattern creation device according to claim 5, wherein the third creation unit creates the plurality of dither patterns, the dither patterns being patterns in which the adjacent lines are connected in a manner to intersect with a direction in which the lines extend.

7. The dither-pattern creation device according to claim 6, wherein the third creation unit creates dither patterns in which, in a state where the adjacent lines are connected at the tip ends, diameter of the void portion of the void-dot pattern is equal to line-to-line distance of the adjacent lines.

8. A dither-pattern creation method comprising:
creating a plurality of dither patterns, each of the dither patterns being associated with one of gray levels in a first range, the dither patterns being line screens, the line screens being line patterns varying with the gray level such that as the gray level increases, line width increases;

creating a plurality of dither patterns, each of the dither patterns being associated with one of gray levels in a second range higher than the gray levels of the first range, the dither patterns being void-dot screens, the void-dot screens being patterns varying with the gray level such that as the gray level increases, the void-dot diameter or the number of the void dots increase in a manner to reduce void portions surrounded by the dots; and creating a plurality of dither patterns for switching from the line screen to the void-dot screen, the dither patterns being patterns varying with the gray level such that as the gray level increases from a reference gray level, adjacent lines in the line patterns are connected at joint portions of the lines, the joint portions being tapered toward tip ends, in a manner that a position where the joint portions are connected gradually advances from the tip ends to basal ends of the joint portions.

* * * * *